US012668345B1

(12) United States Patent
Smith et al.

(10) Patent No.: US 12,668,345 B1
(45) Date of Patent: Jun. 30, 2026

(54) GEARCASES FOR MARINE DRIVES AND METHODS OF MAKING GEARCASES FOR MARINE DRIVES HAVING REDUCED NOISE OUTPUT

(71) Applicant: Brunswick Corporation, Mettawa, IL (US)

(72) Inventors: Joshua S. Smith, Mayville, WI (US); Jeffrey Chiang, Oshkosh, WI (US); Theodore J. Hanes, Fond du Lac, WI (US); Brett Bielefeld, Oshkosh, WI (US); David A. Kobilic, Oakfield, WI (US)

(73) Assignee: Brunswick Corporation, Mettawa, IL (US)

( * ) Notice: Subject to any disclaimer, the term of this patent is extended or adjusted under 35 U.S.C. 154(b) by 7 days.

(21) Appl. No.: 18/630,210

(22) Filed: Apr. 9, 2024

(51) Int. Cl.

| | |
|---|---|
| *G05D 1/223* | (2024.01) |
| *B63H 21/36* | (2006.01) |
| *B63H 21/38* | (2006.01) |
| *B63H 23/06* | (2006.01) |
| *B63H 23/32* | (2006.01) |
| *B63H 23/34* | (2006.01) |
| *B22D 19/00* | (2006.01) |
| *B29C 39/10* | (2006.01) |
| *B29K 307/04* | (2006.01) |
| *B29K 309/08* | (2006.01) |
| *B29K 705/02* | (2006.01) |

(52) U.S. Cl.
CPC ............. *B63H 23/06* (2013.01); *B63H 21/36* (2013.01); *B63H 21/38* (2013.01); *B63H 23/321* (2013.01); *B63H 23/34* (2013.01); *B22D 19/0036* (2013.01); *B29C 39/10* (2013.01); *B29K 2307/04* (2013.01); *B29K 2309/08* (2013.01); *B29K 2705/02* (2013.01)

(58) Field of Classification Search
CPC ........ B63H 23/06; B63H 21/36; B63H 21/38; B63H 23/321; B63H 23/34; B22D 19/0036; B29C 39/10; B29K 2307/04; B29K 2309/08; B29K 2705/02
See application file for complete search history.

(56) References Cited

U.S. PATENT DOCUMENTS

| | | |
|---|---|---|
| 10,323,721 B1 | 6/2019 | Smith et al. |
| 10,752,328 B1 | 8/2020 | Bielefeld et al. |
| 2016/0137280 A1* | 5/2016 | Sugiyama .............. B63H 20/20 440/75 |

* cited by examiner

*Primary Examiner* — Victor L MacArthur
(74) *Attorney, Agent, or Firm* — Andrus Intellectual Property Law, LLP

(57) ABSTRACT

A gearcase for a marine drive, the gearcase having a housing made of a first material, a driveshaft extending into the housing, a propulsor shaft extending from the housing, a gearset rotationally coupling the driveshaft to the propulsor shaft such that rotation of the driveshaft causes rotation of the propulsor shaft, and a stiffening insert made of a second material that is stiffer than the first material, the stiffening insert reinforcing the housing in a manner that limits gear misalignment that would otherwise occur based on gear forces and applied loads on the gearset. Stiffening inserts and methods of manufacturing a gearcase having a stiffening insert are also provided.

23 Claims, 9 Drawing Sheets

GEARCASES FOR MARINE DRIVES AND METHODS OF MAKING GEARCASES FOR MARINE DRIVES HAVING REDUCED NOISE OUTPUT

FIELD

The present disclosure relates to marine drives and particularly to gearcases for marine drives and methods of making gearcases for marine drives having reduced noise output.

BACKGROUND

U.S. Pat. No. 10,323,721 is incorporated herein by reference and discloses a marine drive having an output gear with a beveled gear and a hub. A propeller shaft extends through the hub. A first bearing and an adjacent second bearing are located on the hub and support rotation of the output gear. The first and second bearings have inner races and outer races. An inner spacer is located on the hub and sandwiched between the respective inner races of the first and second bearings. An outer spacer is sandwiched between the respective outer races of the first and second bearings. A bearing carrier surrounds the propeller shaft and holds the first and second bearings therein by way of a press fit. The inner and outer spacers and the bearing carrier are dimensionally sized to provide a dimensional preload on the first and second bearings to maintain the output gear in alignment with the propeller shaft during operation of the marine drive.

U.S. Pat. No. 10,752,328 is incorporated herein by reference and discloses a gear mounting assembly for causing rotation of a propeller on a marine drive. The assembly includes a driveshaft; a first bevel gear on the driveshaft, wherein rotation of the driveshaft causes rotation of the first bevel gear; a propeller shaft for supporting the propeller such that rotation of the propeller shaft causes rotation of the propeller; a gear hub on the propeller shaft; a second bevel gear on the gear hub, wherein the second bevel gear is engaged with the first bevel gear such that rotation of the driveshaft causes rotation of the gear hub, which thereby causes rotation of the propeller shaft; and an adapter facilitating relative rotation between the propeller shaft and the gear hub when the gear hub is caused to rotate by the driveshaft.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

The present disclosure provides examples of a gearcase for a marine drive having a housing made of a first material, a driveshaft extending into the housing, a propulsor shaft extending from the housing, a gearset rotationally coupling the driveshaft to the propulsor shaft such that rotation of the driveshaft causes rotation of the propulsor shaft, and a stiffening insert made of a second material that is stiffer than the first material, the stiffening insert reinforcing the housing in a manner that limits gear misalignment that would otherwise occur based on gear forces and applied loads on the gearset.

In independent aspects, a driveshaft bearing supports rotation of the driveshaft relative to the gearcase, wherein the stiffening insert is positioned between the driveshaft bearing and the housing. The stiffening insert may surround the driveshaft bearing. In non-limiting examples, the driveshaft bearing may comprise a roller bearing and the stiffening insert and at least a portion of the roller bearing, for example an outer race of the roller bearing, may be one piece.

In independent aspects, a propulsor shaft bearing supporting rotation of the propulsor shaft relative to the housing. The stiffening insert is positioned between the propulsor shaft bearing and the housing. The stiffening insert may surround the propulsor shaft bearing. The propulsor shaft bearing may comprise a roller bearing and the stiffening insert and at least a portion of the roller bearing, for example an outer race of the roller bearing, may be one piece. The gearset may comprise a drive gear on the driveshaft and a driven gear on the propulsor shaft. A driven gear bearing may support rotation of the driven gear relative to the propulsor shaft, wherein the stiffening insert is positioned between the driven gear bearing and the housing.

In independent aspects, a clutch may be configured to operatively engage the driven gear with the propulsor shaft such that rotation of the driven gear causes rotation of the propulsor shaft. The propulsor shaft bearing supports rotation of the driven gear and the propulsor shaft relative to the housing when the driven gear is operatively engaged with the propulsor shaft.

In independent aspects, the propulsor shaft bearing is a first propulsor shaft bearing supporting rotation of the propulsor shaft relative to the housing. A second propulsor shaft bearing may support rotation of the propulsor shaft relative to the housing, wherein the stiffening insert is positioned between the first propulsor shaft bearing and the housing, and between the second propulsor shaft bearing and the housing.

In independent aspects, the gearset comprises a drive gear on the driveshaft, a first driven gear on the propulsor shaft, and a second driven gear on the propulsor shaft, and further comprising a first driven gear bearing supporting rotation of the first driven gear relative to the propulsor shaft and a second driven gear bearing supporting rotation of the second driven gear relative to the propulsor shaft, and wherein the stiffening insert is positioned between the first driven gear bearing and the housing, and between the second driven gear bearing and the housing. The stiffening insert may surround the first driven gear bearing and the second driven gear bearing. A driveshaft bearing may support rotation of the driveshaft relative to the gearcase, wherein the stiffening insert surrounds the driveshaft bearing.

In independent aspects, a driveshaft bearing supports rotation of the driveshaft relative to the gearcase and a propulsor shaft bearing supports rotation of the propulsor shaft relative to the housing, wherein the stiffening insert is positioned between the driveshaft bearing and the housing, and between the propulsor shaft bearing and the housing. The stiffening insert may surround the driveshaft bearing and the propulsor shaft bearing.

In independent aspects, the stiffening insert may comprise a monolithic body having a first lobe that surrounds the driveshaft and a second lobe that surrounds the propulsor shaft. The first lobe may surround a driveshaft bearing supporting rotation of the driveshaft relative to the housing and the second lobe may surround a propulsor shaft bearing supporting rotation of the propulsor shaft relative to the housing. At least one arm may couple the first lobe to the second lobe. The at least one arm may be one of a pair of arms and further wherein a through-bore passage facilitating supply of lubrication to the housing is defined between the pair of arms.

The present disclosure further provides methods of casting the housing with the stiffening insert in the housing. The methods may include heating the stiffening insert prior to casting. In non-limiting examples, the methods may include controlling temperature of the housing and the stiffening insert such that once the gearcase is formed the stiffening insert applies a pre-stress on the gearcase. The methods may include selecting an ideal pre-stress on the gearcase for limiting noise of the gearcase, and then controlling temperature of the housing and the stiffening insert such that once the gearcase is formed stiffening insert applies the ideal pre-stress on the gearcase. The methods may include providing the stiffening insert with grooves that form a mechanical bond with the housing during said casting.

The present disclosure further provides examples of a stiffening insert for rigidly supporting and thus reinforcing a gearcase for a marine drive. The stiffening insert comprises a monolithic body having a first lobe configured to surround a driveshaft extending into the gearcase and a second lobe configured to surround a propulsor shaft extending from the gearcase, and at least one arm that couples the first lobe to the second lobe.

BRIEF DESCRIPTION OF THE DRAWINGS

The present disclosure includes the following Figures.

DETAILED DESCRIPTION OF THE DRAWINGS

Figure 1:
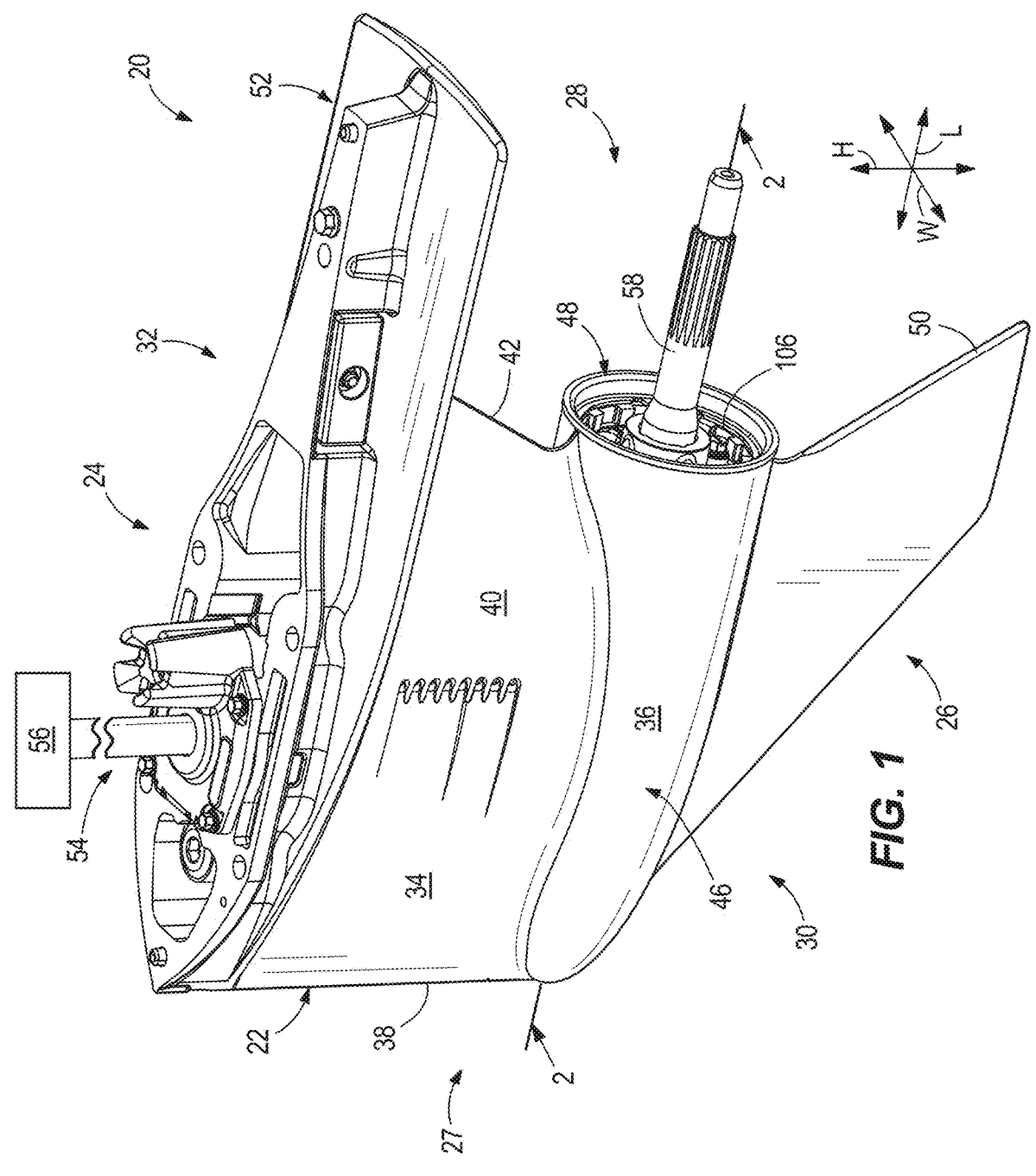
FIG. 1 is a perspective view of a non-limiting first example of a gearcase of a marine drive according to the present disclosure.

Conventional marine drives typically have gearcases with a relatively small and streamlined shape configured to limit hydrodynamic drag on the gearcase as it travels through the water. During research and development, the present inventors have determined that such gearcases often require a highly power dense transmission that produces internal gear loads which generate significant gear deflection values (i.e., gear misalignments). This negatively affects noise, vibration and harshness (NVH) characteristics of the gearcase. Further, to improve durability of such power dense transmissions, transmission gearset(s) often require microgeometry modifications to accommodate said gear misalignments which, while beneficial to durability (by for example avoiding contact loading at the edge of the gear tooth), also cause relatively noisier operation than would otherwise occur. The present inventors realized that it would be beneficial to provide improved gearcases for marine drives which are configured to reduce NVH characteristics by reducing gear deflections, which in turn enables reduced microgeometry modifications while also maintaining the relatively small and streamlined shape of the gearcase.

As disclosed herein, the present inventors conceived of novel gearcase housings having a stiffening apparatus that advantageously facilitates reduction in the noise emanating from the gearcase, in accordance with the above-described objectives. The presently disclosed stiffening apparatuses are specially configured to reinforce the housing of the gearcase at least proximate to the gearsets contained therein such that vibrations from the gearsets do not generate as much vibration of the housing, i.e., such that the housing becomes a less effective converter of the gearset vibration into sound.

Through research and development, the present inventors determined that conventional gearcases, which often are made of aluminum, tend to vibrate based on the vibrations of the gearset(s) therein. The presently disclosed stiffening apparatuses, which are made of a stiffer material than the material of the gearcase housing, locally stiffen the housing at least along the location of the gearset(s) and thus limit its vibration and the sound that would otherwise be generated. Vibration is effectively limited if there is a natural mode of the gearcase (frequency at which the gearcase tends to naturally resonate) which coincides with an operating region of the gearcase. These modes will be dependent on the structural attributes of the gearcase as well as the loading conditions (torque, thrust, etc.) and boundary conditions. The present inventors found that increasing stiffness of the gearcase in the area that participates in that mode may drive that frequency higher—and if it is driven high enough it will be outside the operating range of the system. Stiffening the structure may serve to reduce the potential that a prominent mode that is efficient at radiating gear noise would be within the applicable operating range by increasing the modal frequency and reducing its acoustic radiating efficiency.

The present disclosure contemplates several embodiments of the stiffening apparatuses, with two non-limiting examples of stiffening inserts being described herein below in reference to FIGS. 1-6 and 7-11, respectively. The present inventors have also conceived of improved methods of making the gearcase having the presently disclosed stiffening insert(s), for example by casting the insert(s) in place during formation of the gearcase.

FIG. 1 illustrates a gearcase 20 for a marine drive configured to propel a marine vessel in water. The type and configuration of marine drive may vary, and for example may include an outboard motor, a stern drive, a pod drive, an inboard/outboard motor, and/or any other known marine drive for propelling a marine vessel in water. The gearcase 20 has a housing 22 that extends from top 24 to bottom 26 in a height direction H, from front 27 to rear 28 in a length direction L that is perpendicular to the height direction H, and from side 30 to opposite side 32 in a width direction W that is perpendicular to the height direction H and perpendicular to the length direction L. The gearcase 20 has a strut 34 which extends in the length direction L and transitions in the height direction H to an elongated torpedo housing 36. The strut 34 and torpedo housing 36 both have a relatively small profile shape with smooth outer contours so as to limit hydrodynamic drag in the water. The strut 34 has a rounded leading end 38 and convexly rounded opposing sides 40 that extend in the length direction L from the leading end 38 to a trailing edge 42. The torpedo housing 36 has a rounded or cone-shaped leading end 44 and a tubular outer profile 46 that radially expands in the length direction L to a cylindrical trailing end 48. An angular skeg 50 protrudes from the bottom of the torpedo housing 36. An anti-cavitation plate 52 extends over the top of the strut 34 and protrudes rearwardly from the strut 34.

Figure 2:
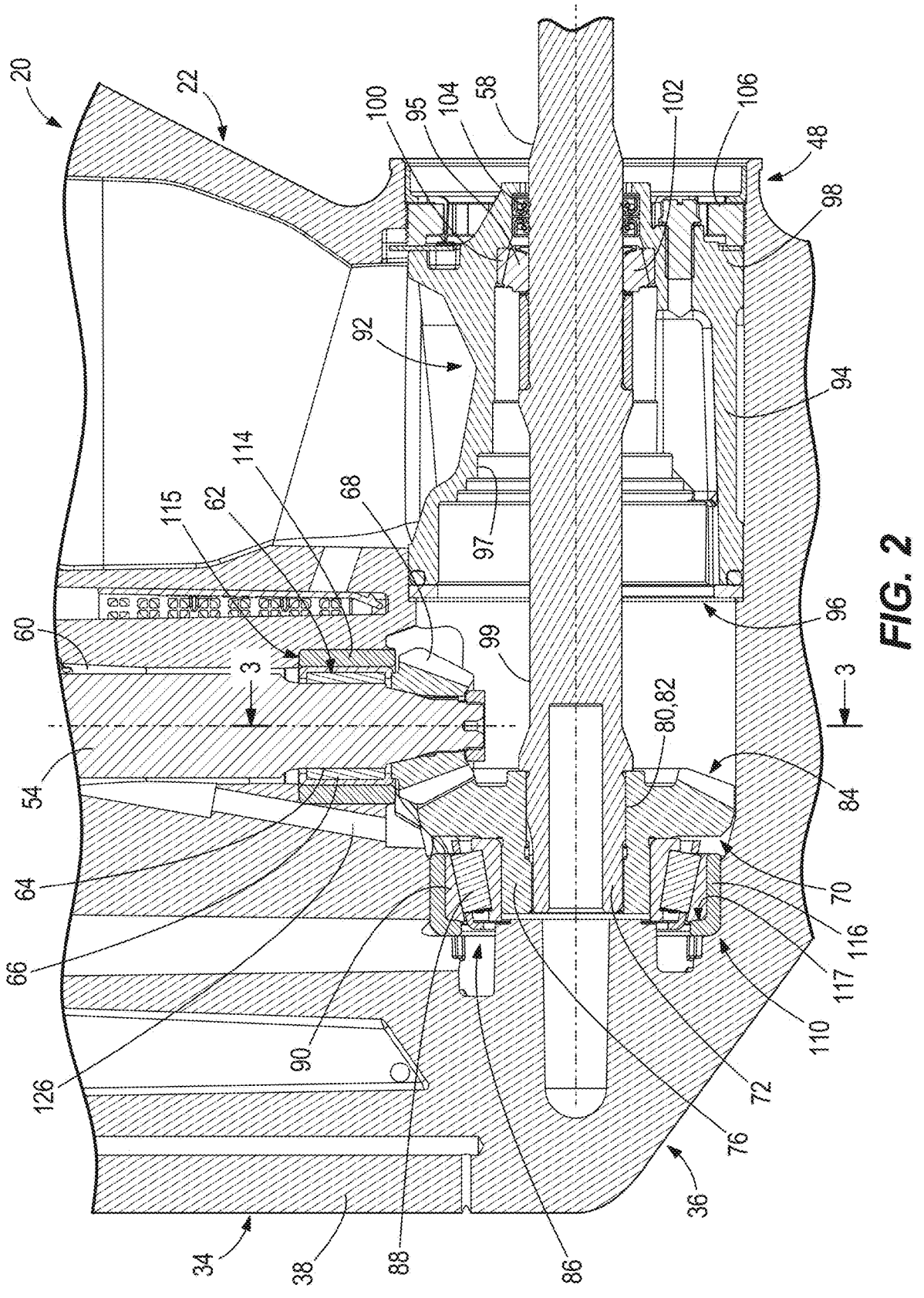
FIG. 2 is a view of section 2-2, taken in FIG. 1.

Referring to FIGS. 1 and 2, a driveshaft 54 extends through the anti-cavitation plate 52 and into the interior of the housing 22. The driveshaft 54 is caused to rotate by a driver 56, which is shown schematically in FIG. 1, and which can be any conventional mechanism for causing rotation of a driveshaft of a marine drive, for example an internal combustion engine, an electric motor, and/or any combination thereof. A propulsor shaft 58 extends into the cylindrical trailing end 48 of the torpedo housing 36 and is configured to support a propulsor on its outer end. The propulsor is not shown but can be any conventional mechanism for generating a thrust force in a body of water based upon rotation of the propulsor shaft 58, for example including but not limited to one or more propeller(s), impeller(s), and/or the like.

Referring to FIG. 2, the housing 22 has a driveshaft passage 60 into which the driveshaft 54 extends in the height direction H. A driveshaft bearing 62 supports rotation of the driveshaft 54 about its own axis relative to the housing 22. The type and configuration of the driveshaft bearing 62 may vary widely from what is shown and described. In the illustrated example, the driveshaft bearing 62 is a roller bearing having elongated rollers 64 that are retained by at least one race 66 in the driveshaft passage 60. Rotation of the driveshaft 54 causes rotation of the rollers 64 relative to the race 66. In other examples, the driveshaft bearing 62 may include more than one roller bearing and/or any other suitable type of bearing for supporting rotation of the driveshaft 54 relative to the housing 22.

A drive gear 68 is positioned on the lower end of the driveshaft 54. The drive gear 68 is rotationally fixed relative to the driveshaft 54 so that rotation of the driveshaft 54 causes rotation of the drive gear 68. In the illustrated example, the drive gear 68 is an angular or pinion gear, however the type and configuration of the drive gear 68 may vary from what is shown and described.

A driven gear 70 is positioned on the inner end 72 of the propulsor shaft 58. Together the drive gear 68 and the driven gear 70 constitute a gearset that rotationally couples the driveshaft 54 to the propulsor shaft 58 so that rotation of the driveshaft 54 causes rotation of the propulsor shaft 58. The manner of attachment of the driven gear 70 to the propulsor shaft 58 can vary from what is shown and described, as will be evident from the following description of the embodiment shown in FIGS. 7-10. In the example of FIGS. 1-6, the driven gear 70 has a hub 76 with a central bore into which the inner end 72 propulsor shaft 58 extends. Axial splines 80 in the central bore are meshed with corresponding axial splines 82 on the inner end 72 of the propulsor shaft 58 such that rotation of the driven gear 70 causes rotation of the propulsor shaft 58. The driven gear 70 also has an angle or bevel gear 84 supported on the forward end of the hub 76. The bevel gear 84 is meshed with the drive gear 68 such that rotation of the driveshaft 54 and drive gear 68 causes commensurate rotation of the driven gear 70 and propulsor shaft 58. More specifically, the drive gear 68 and driven gear

70 have gear teeth (see FIG. 2) that are meshed together such that rotation of the drive gear 68 causes rotation of the driven gear 70. Rotation of the driven gear 70 causes rotation of the propulsor shaft 58 due to the rotational coupling of these components by the axial splines 80, 82.

A propulsor shaft bearing 86 supports rotation of the driven gear 70 and the inner end 72 of the propulsor shaft 58 relative to the housing 22. The type and configuration of the propulsor shaft bearing 86 may vary from what is shown and described. In the illustrated example, the propulsor shaft bearing 86 is a tapered roller bearing having rollers 88 retained by at least one race, for example inner and outer races 90 that surround hub 72 and the propulsor shaft 58. Rotation of the driven gear 70 and the propulsor shaft 58 is supported by rotation of the rollers 88 about their own axes and relative to the races 90. In other examples, the propulsor shaft bearing 86 may include more than one tapered roller bearing and/or any other suitable type of and number of bearing for supporting rotation of the driven gear 70 and the propulsor shaft 58.

A bearing carrier 92 is located in the torpedo housing 36 and supports one or more additional bearing(s) for supporting rotation of the propulsor shaft 58 relative to the torpedo housing 36. The type and configuration of the bearing carrier 92 is not germane to this embodiment and may vary from what is shown and described. Further discussion of bearing carriers is provided in the above-incorporated U.S. Pat. No. 10,323,721. In the illustrated example, the bearing carrier 92 has an elongated body 94 that extends from a forward end 96 to a rearward end 98. At least one bearing 95 is supported by the bearing carrier 92 and is disposed between an inner surface 97 of the bearing carrier 92 and the outer diameter 99 of the propulsor shaft 58. In the illustrated example, the bearing 95 is a roller bearing having at least one race 100 and several rollers 102 supported by the race 100. Rotation of the propulsor shaft 58 is supported by rotation of the rollers 102 relative to the race 100. One or more seals 104 is disposed on propulsor shaft 58 at the rearward end 98 of the bearing carrier 92. The one or more seal(s) 104 abut the outer diameter of the propulsor shaft 58 and thus limit water ingress to the interior of the torpedo housing 36. An end cap 106 is fastened to the cylindrical trailing end 48 of the torpedo housing 36 and helps retain the bearing carrier 92 and related components in place.

As discussed herein above, the gearcase 20 also contains a novel stiffening insert 110 that is specially configured to reinforce the housing 22 in a manner that stiffens the housing 22 proximate to the gearset and limits gear misalignments that would otherwise occur based on gear forces and applied loads on the gearset. The configuration of the stiffening insert can widely vary, and a second non-limiting example stiffening insert 110a is illustrated in FIGS. 7-11 and will be described herein below. The stiffening inserts 110, 110a disclosed herein are made of a different material than the housing 22, and more particularly are made of a stiffer material than the housing 22. In other words, the stiffening inserts 110, 110a are made of a material having a higher modulus of elasticity than the material of which the housing 22 is made. The respective materials of the housing 22 and the stiffening insert 110, 110a may vary widely. In non-limiting examples, the housing 22 is made of aluminum and the stiffening insert 110, 110a is made of steel (including various types of steel such as high carbon steel or low carbon steel), cast iron, titanium, and/or carbon fiber. In non-limiting examples the carbon fibers may be oriented in the direction of loading, further improving stiffness and strength. In non-limiting examples, the housing 22 may be made of a polymer material, for example but not limited to a glass-filled polymer, which advantageously may avoid issues related to corrosion, and the stiffening insert 110, 110a may be made of aluminum and/or any other material having a higher modulus of elasticity. These examples are not intended to be limiting. Alternative materials may be implemented to reduce risk of corrosion compared to materials that are traditionally used in marine gearcases. Also, location of the stiffening insert 110 inside the housing limits or completely prevents exposure to water, including for example saltwater, under normal operation conditions thus also reducing risk of corrosion.

Figure 3:
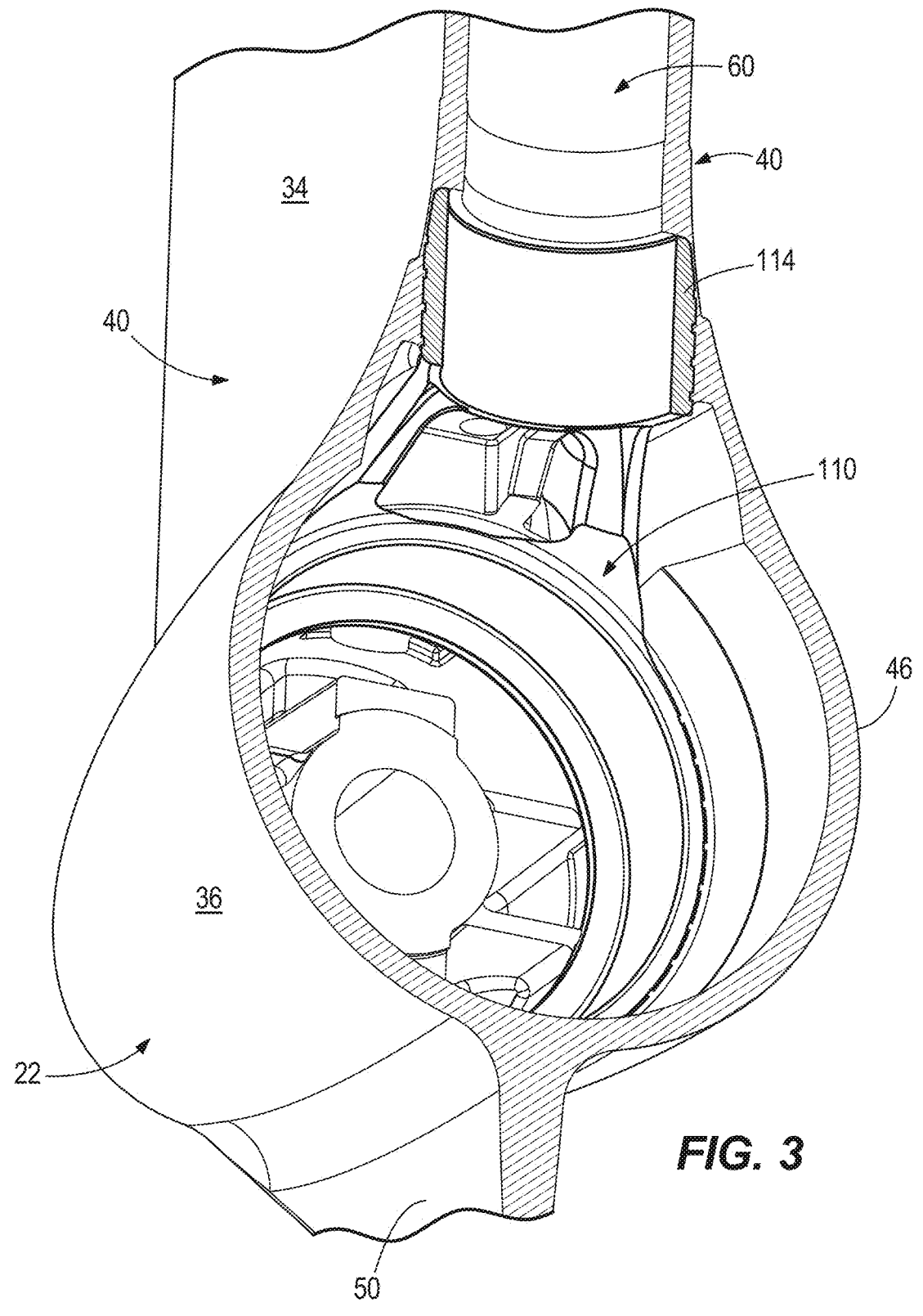
FIG. 3 is a view of section 3-3, taken in FIG. 2.
Figure 4:
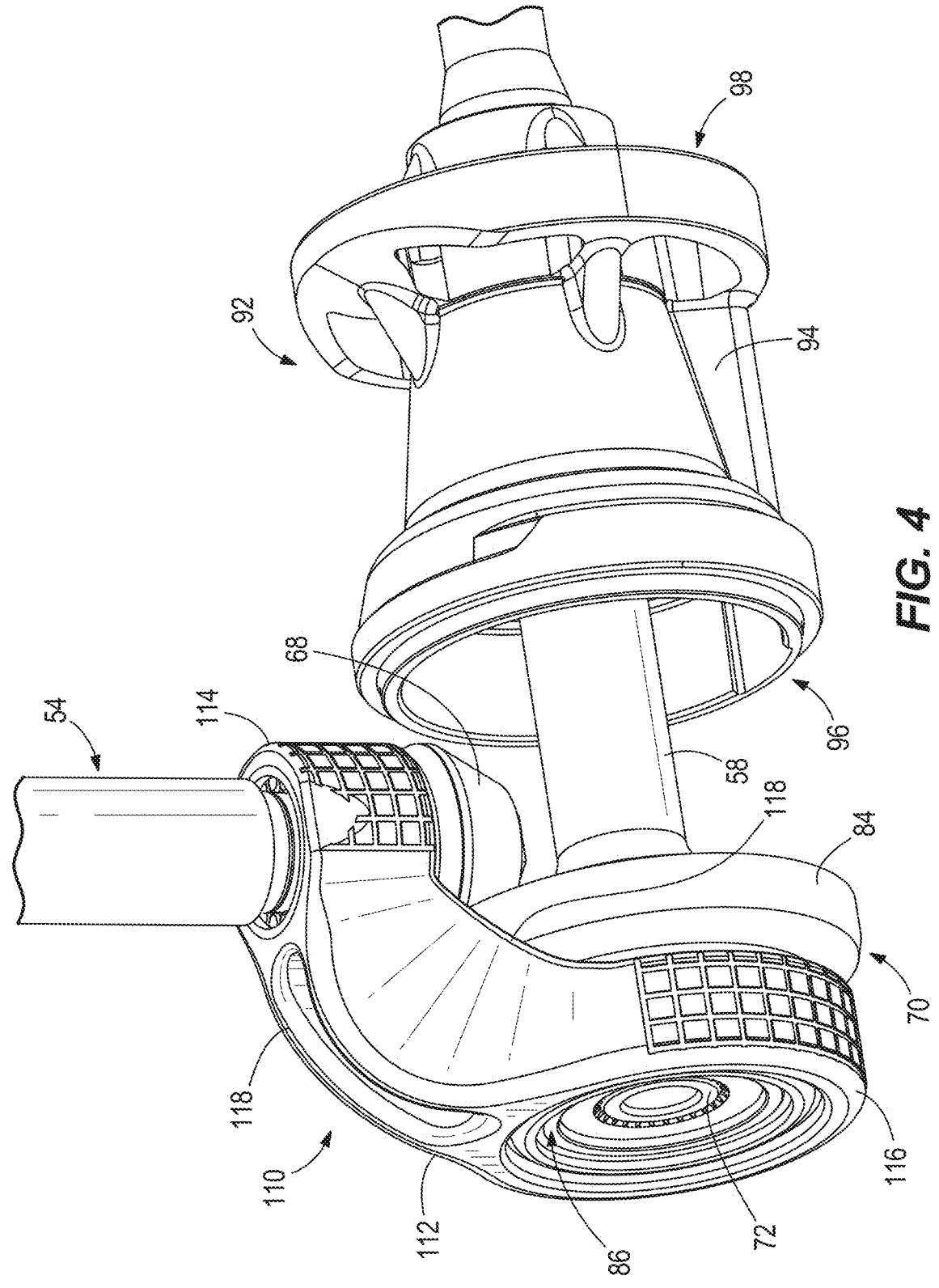
FIG. 4 is a perspective view of portions of the gearcase of FIG. 1, including a driveshaft, a propulsor shaft, a bearing carrier, and a non-limiting first example of a stiffening insert configured according to the present disclosure.
Figures 5, 6:
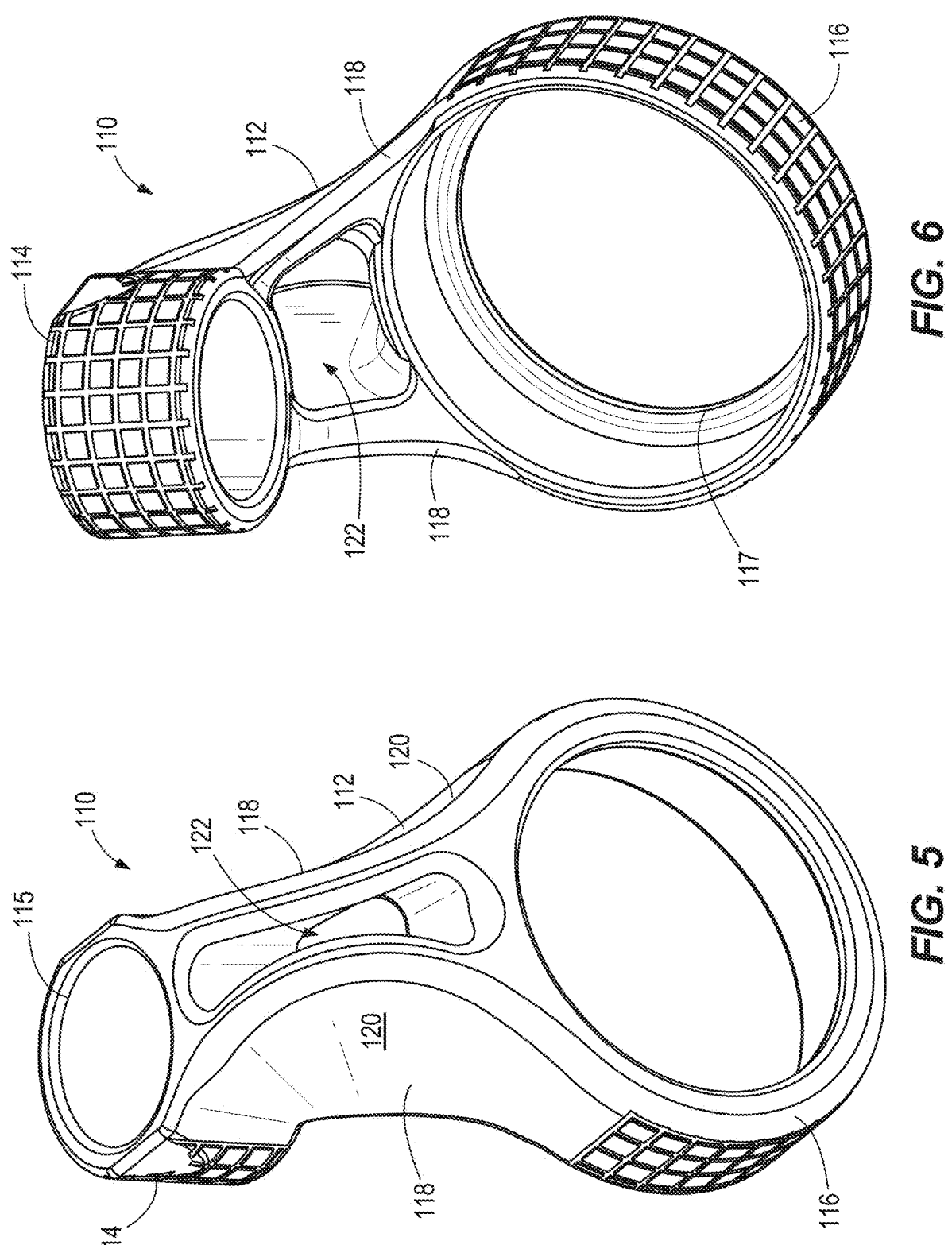
FIG. 5 is a perspective view of the stiffening insert of FIG. 4.
FIG. 6 is an opposing perspective view of the stiffening insert of FIG. 4.
Figure 7:
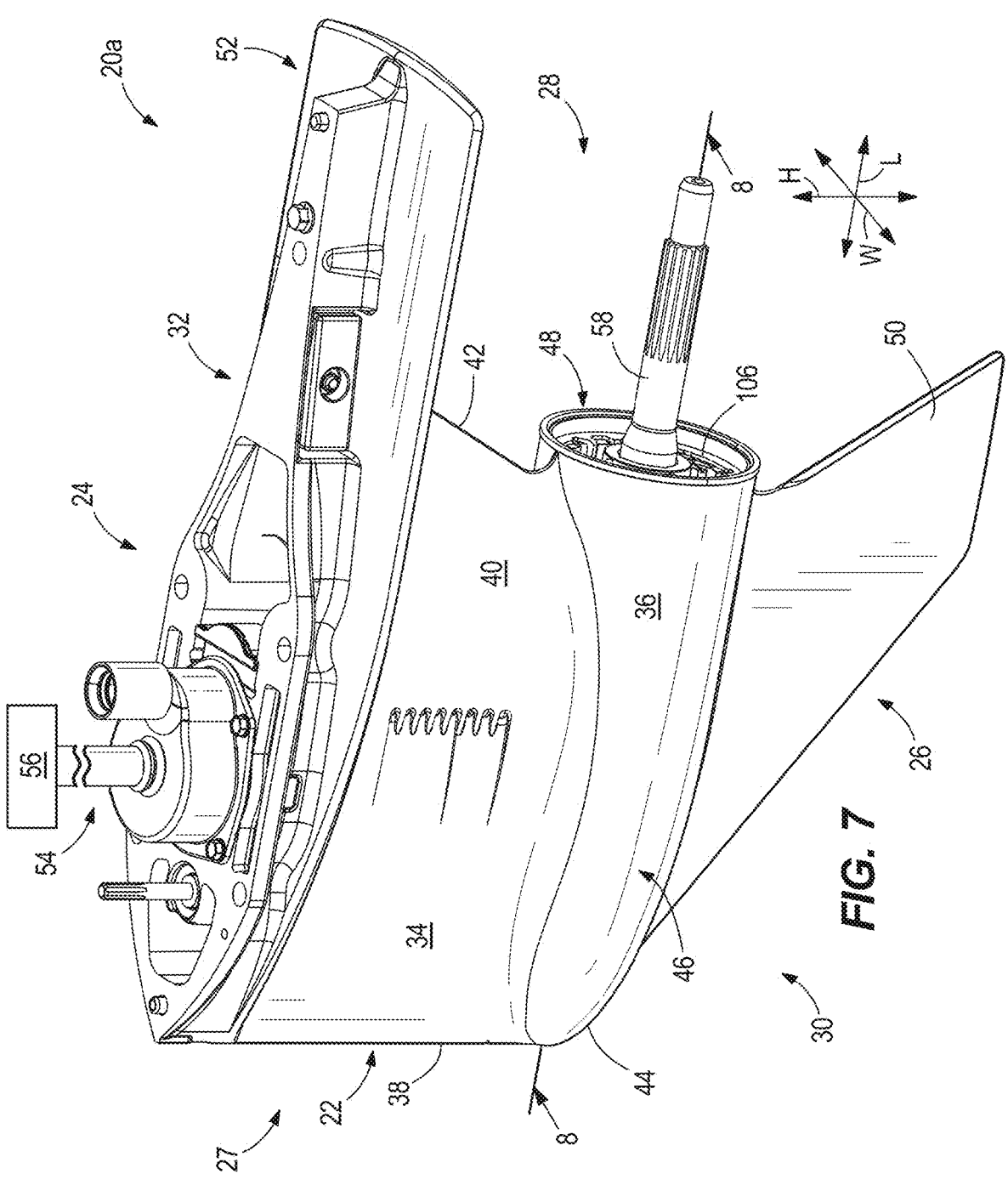
FIG. 7 is a perspective view of a non-limiting second example of a gearcase of a marine drive according to the present disclosure.

Referring FIGS. 1-6, and as best shown in FIGS. 4-6, the stiffening insert 110 has a monolithic (one-piece) body 112 with a first lobe 114 that surrounds the driveshaft 54 and a second lobe 116 that surrounds the propulsor shaft 58. The first lobe 114 is an annular member having an inner diameter through which the driveshaft 54 extends in the height direction H. The second lobe 116 is an annular member having a relatively larger inner diameter than the first lobe 114. The second lobe 116 receives the inner end 72 of the propulsor shaft 58 and the hub 76 of the driven gear 70 in the length direction L. As shown in the drawings, the first lobe 114 and second lobe 116 are oriented transversely relative to each other. In the non-limiting illustrated example, the first lobe 114 and second lobe 116 are oriented perpendicularly relative to each other. The first lobe 114 surrounds the driveshaft bearing 62 and the driveshaft 54 and the second lobe 116 surrounds the inner end 72 of the propulsor shaft 58, the hub 76 of the driven gear 70, and the propulsor shaft bearing 86, thus reinforcing the housing 22 alongside those components. As best shown in FIGS. 2 and 3, the first lobe 114 is positioned in the driveshaft passage 60 above and adjacent to the drive gear 68. The first lobe 114 is positioned between the driveshaft bearing 62 and the inner diameter of the driveshaft passage 60 in both the length direction L and the width direction W. The second lobe 116 is positioned in the torpedo housing 36 immediately between the propulsor shaft bearing 86 and the inner diameter of the torpedo housing 36 in both the height direction H and the width direction W. The second lobe 116 surrounds the propulsor shaft bearing 86, the hub 76 of the driven gear 70, and the inner end 72 or the propulsor shaft 58, thus reinforcing the housing 22 alongside those components.

Referring to FIGS. 4-6, a pair of arms 118 connects the first lobe 114 to the second lobe 116. Each arm 118 has a smooth outer surface 120 that is inwardly curved towards the other arm 118 so as to provide a narrow outer profile along the length of the arms 118. The arms 118 extend alongside the gearset and between the gearset and an inner side of the housing 22, thus reinforcing the housing 22 alongside the gearset. A through-bore passage 122 defined between the inner surfaces 124 of the arms 118 advantageously facilitates supply of lubrication to the torpedo housing 36. That is, the lubrication is supplied through the lubrication channel 126 in the strut 34, through the through-bore passage 122 of the stiffening insert 110, and to the torpedo housing 36 for lubricating the bearings and/or other components contained therein.

Referring to FIGS. 2, 3, and 6, the first lobe 114 and the second lobe 116 have annular inner shoulders 115, 117, respectively. The annular inner shoulders 115, 117 protrude radially inwardly from an end of the respective lobe 114, 116. As shown in FIG. 2, the annular inner shoulders 115, 117 are configured to retain the races 66, 90 in place relative to the housing 22. The race 66 is retained in the height direction H between the annular shoulder 115a on top of the drive gear 68. The race 90 is retained in the length direction L between the annular shoulder 117 and a surface on the rear of the driven gear 70. This is not a limiting example, and present inventors have also conceived of examples wherein the races 66, 90 or for example a portion of the respective bearings, such as the outer race thereof, is/are formed as a single piece with the stiffening insert 110, i.e., such that the stiffening insert 110 and at least a portion of one or both of the bearings are provided as a monolithic part.

FIGS. 7-11 illustrate another example of a gearcase 20a according to the present disclosure, in particular having the noted stiffening insert 110a. Aspects of the gearcase 20a in FIGS. 7-11 are similar to or the same as aspects described herein above regarding the gearcase 20. These aspects are given the same reference numbers denoted herein above.

Figure 8:
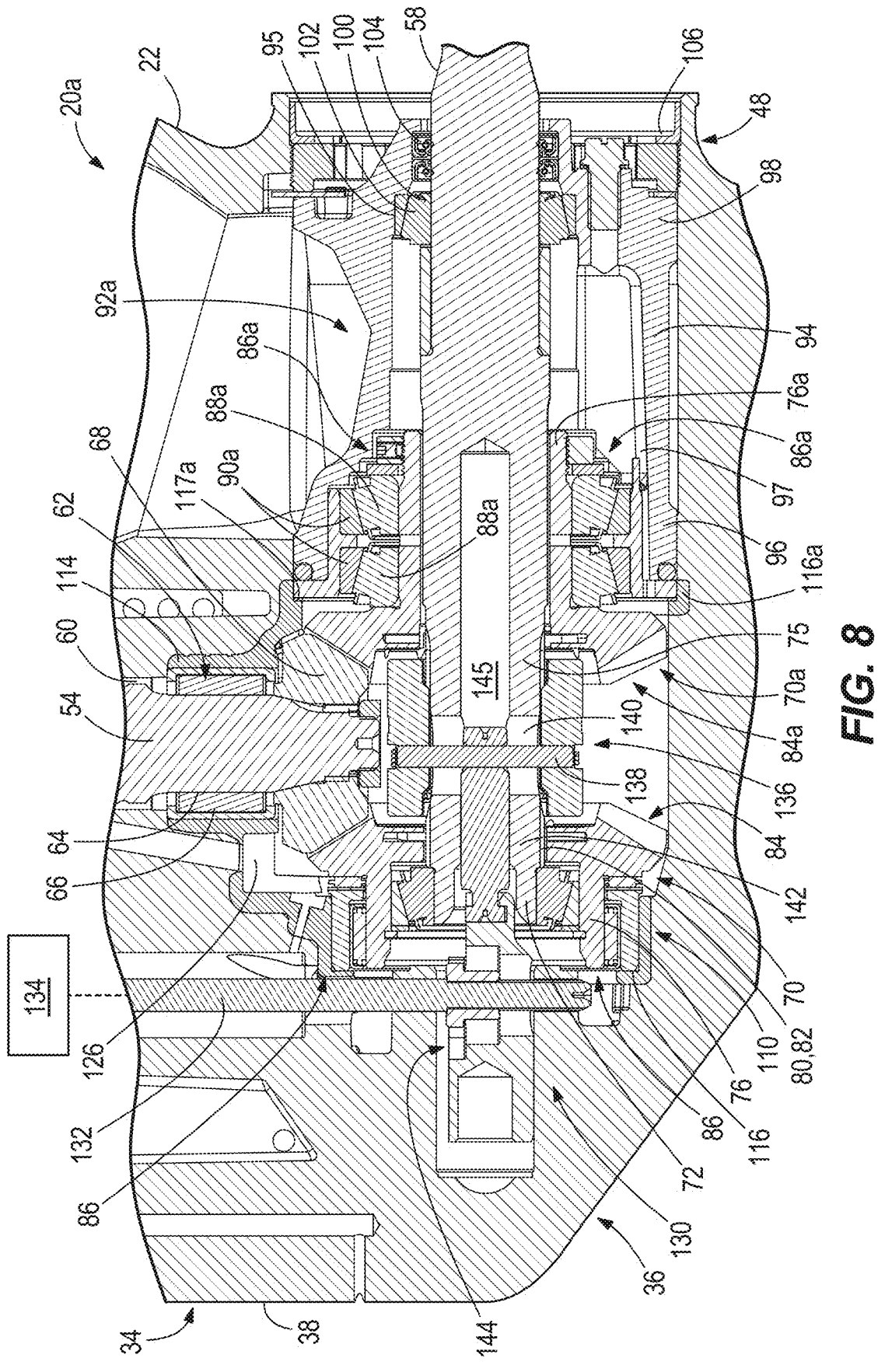
FIG. 8 is a view of section 8-8 taken in FIG. 7.
Figure 9:
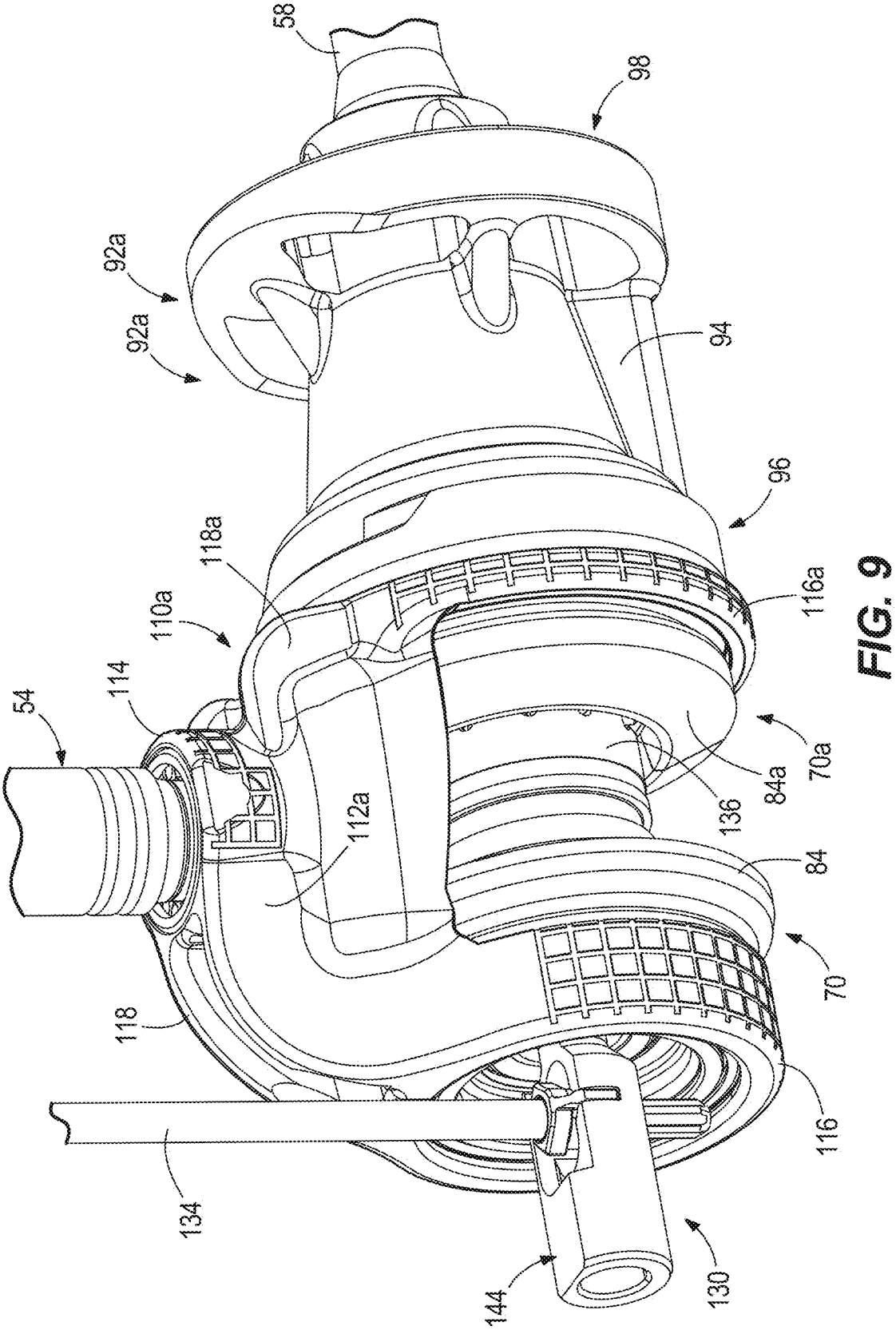
FIG. 9 is a perspective view of portions of the gearcase of FIG. 7, including a driveshaft, a propulsor shaft, a bearing carrier, and a non-limiting second example of a stiffening insert configured according to the present disclosure.

Referring to FIGS. 8-9, unlike the gearcase 20, the gearcase 20a has a pair of opposed driven gears 70, 70a having bevel gears 84, 84a supported on hubs 76, 76a, respectively. The bevel gears 84, 84a are meshed with the drive gear 68 such that rotation of the driveshaft 54 and drive gear 68 causes rotation of the driven gears 70, 70a. The driven gears 70, 70a are configured to rotate oppositely relative to each other upon rotation of the drive gear 68 to as to alternately provide forward and reverse rotation of the propulsor shaft 58, as described herein below.

A propulsor shaft bearing 86a supports rotation of the driven gear 70a and the propulsor shaft 58 relative to the housing 22. The type and configuration of the propulsor shaft bearing 86a may vary from what is shown and described. In the illustrated example, the propulsor shaft bearing 86a includes a pair of adjacent and oppositely oriented tapered roller bearings, each having rollers 88a which are retained by at least one race such as inner and outer races 90a surrounding the propulsor shaft 58 and the hub 76a of the driven gear 70a. The tapered roller bearings are located between the inner surface 97 of the bearing carrier 92a and the outer surface of the hub 76a. Rotation of the driven gear 70a and the propulsor shaft 58 is supported by rotation of the rollers 88a relative to the races 90a. In other examples, the propulsor shaft bearing 86a may include less than or more than two tapered roller bearings and/or any other suitable type of bearing for supporting rotation of the driven gear 70a and the propulsor shaft 58.

Unlike the gearcase 20, the gearcase 20a has a clutch 130 that is movable into a forward gear position to rotationally engage one of the driven gears 70, 70a with the propulsor shaft 58, a reverse gear position to engage the other one of the driven gears 70, 70a with the propulsor shaft 58, and a neutral position in which neither of the driven gears 70, 70a are engaged with the propulsor shaft 58. The type and configuration of the clutch 130 is merely exemplary and can vary from what is shown and described herein below. A suitable example clutch is described in more detail in the above-incorporated U.S. Pat. No. 10,752,328.

In the illustrated example, the clutch 130 is a dog clutch generally having a shift actuator shaft 132 that is rotatable about its own axis via a shift actuator 134, which for example may be an electric motor and/or any other mechanical, electro-mechanical, hydraulic, and/or other conventional device for causing rotation of the shift actuator shaft 132. The clutch 130 also includes a clutch body 136 that is slidable lengthwise along the propulsor shaft 58. The clutch body 136 has opposing ends having clutch dogs that are diametrically spaced apart around the respective end and are configured to mesh with corresponding clutch dogs on the hubs 76, 76a respectively. The clutch body 136 has internal splines that mesh with external splines on the propulsor shaft 58 and thus permit the clutch body 136 to slide along the propulsor shaft 58 and transmit torque from the driveshaft 54 to the propulsor shaft 58. A clutch pin 138 extends through the clutch body 136 and through an elongated slot 140 in the propulsor shaft 58. The clutch pin 138 also extends through one end of a clutch actuator rod 142 that is centrally located in a through-bore 145 in the propulsor shaft 58. The opposite end of the clutch actuator rod 142 laterally extends out of the propulsor shaft 58 and is operably engaged with the lower end of the shift actuator shaft 132 via the illustrated clutch connector 144 configured such that rotation of the shift actuator shaft 132 about its own axis by the shift actuator 134 causes lengthwise movement of the clutch actuator rod 142 in the through-bore 145. In the illustrated example, the clutch connector 144 comprises a desmodromic cam and follower. The cam is connected via splines to the shift shaft 132 and configured to transfer the rotational motion of the shift shaft 132 into translational movement of the cam follower. The actuator rod 142 is configured to move together in translational movement with the cam follower. It should be understood that this is a non-limiting example. The type and configuration of the clutch connector 144 may vary widely from what is shown and described, and in other non-limiting examples may include a bell crank, such as disclosed in U.S. Pat. No. 10,752,328. As explained in the incorporated U.S. Pat. No. 10,752,328, lengthwise movement of the clutch actuator rod 142 in the through-bore 145 causes lengthwise movement of the clutch pin 138 in the elongated slot 140, which causes the clutch body 136 to slide along the propulsor shaft 58, which moves the opposite ends of the clutch body 136 into or out of engagement with the hubs 76, 76a depending on the direction of rotation, so as to engage the clutch 130 in the noted forward and reverse gear positions. Again, the type and configuration of the clutch 130 can vary from what is shown and described and the present disclosure equally applies to gearcases having no clutch or a different type of clutch.

Figures 10, 11:
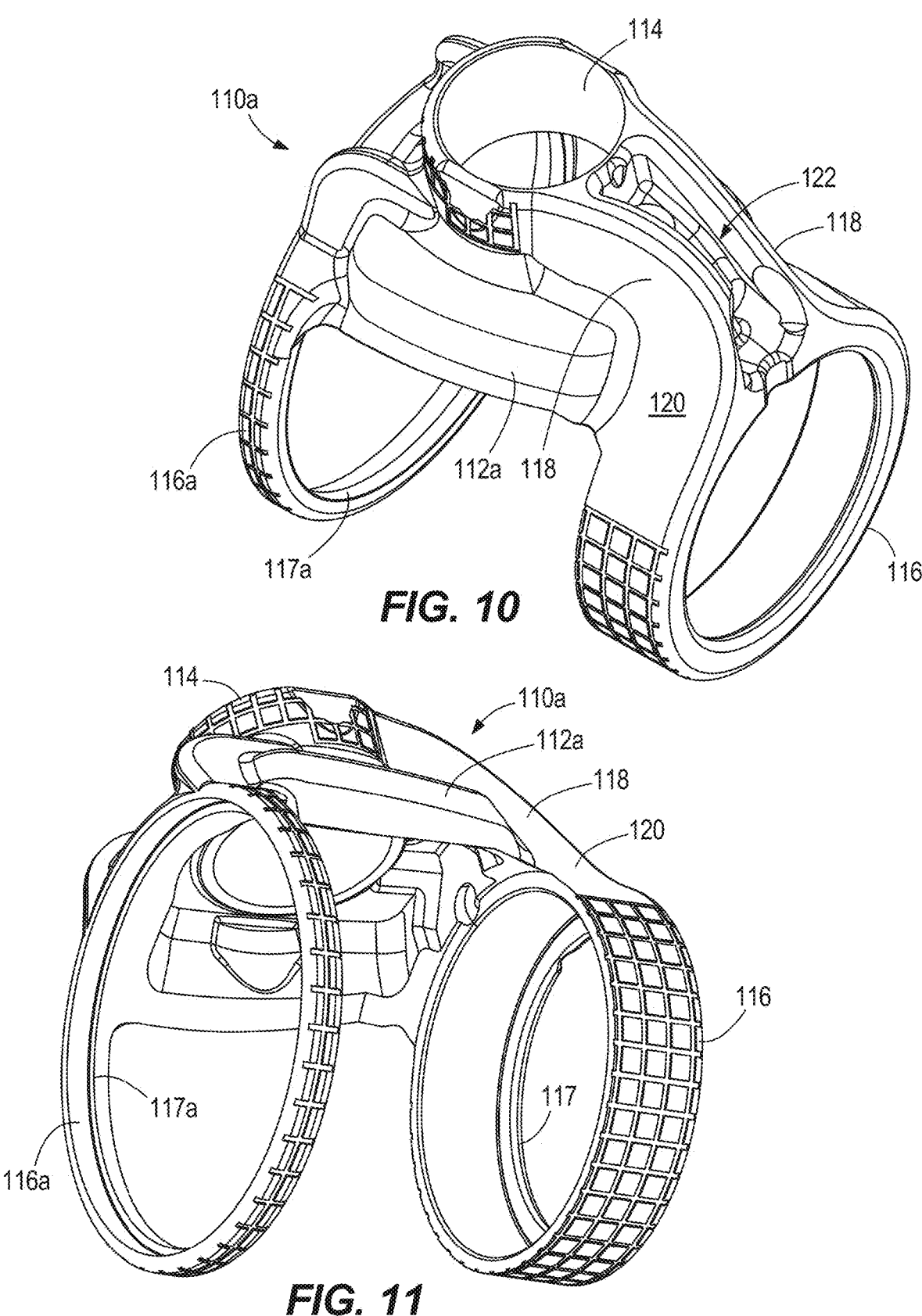
FIG. 10 is a perspective view of the stiffening insert of FIG. 9.
FIG. 11 is an opposing perspective view of the stiffening insert of FIG. 9.

As best shown in FIGS. 9-11, a second example of a stiffening insert 110a is configured for use with embodiments of gearcases having opposed driven gears 70, 70a. The stiffening insert 110a has a monolithic (one-piece) body 112a having the first lobe 114 that surrounds the driveshaft 54, the second lobe 116 that surrounds the inner end 72 of the propulsor shaft 58, and a third lobe 116a that surrounds the middle portion 75 of the propulsor shaft 58. The first lobe 114 and the second lobe 116 are configured like the first lobe 114 and second lobe 116 described herein above, and thus are not further described herein.

The third lobe 116a is an annular member having a relatively larger inner diameter than the first lobe 114 and a relatively larger inner diameter than the second lobe 116. As shown in FIG. 8, the third lobe 116a surrounds the forward end 96 of the bearing carrier 92, and the propulsor shaft bearing 86a, the hub 76a of the driven gear 70a, and the middle portion 75 of the propulsor shaft 58, and thus stiffens the housing 22 alongside those components. Each of these components extend through the annular shape of the third lobe 116a in the length direction L. The third lobe 116 and the first lobe 114 are oriented transversely relative to each other. In the non-limiting illustrated embodiment, the third lobe 116 and the first lobe 114 are perpendicular to each other. The third lobe 116a and the second lobe 116 are coaxial relative to each other and relative to the propulsor shaft 58. As best shown in FIG. 8, the third lobe 116a is positioned in the torpedo housing 36 between the bearing carrier 92 and the inner diameter of the torpedo housing 36 in both the height direction H and the width direction W, thus stiffening the housing 22 in that location.

Referring to FIGS. 10 and 11, a pair of arms 118a couple the first lobe 114 to the third lobe 116a. The pair or arms 118a each having a smooth outer surface 120a that is inwardly curved towards the other arm 118a so as to provide a relatively narrow outer profile along the length of the arms 118a. The arms 118 extend alongside the noted gearset, between the gearset and the interior of the housing 22, thus stiffening the housing along that location.

Referring to FIGS. 8 and 11, the third lobe 116a has an annular shoulder 117a that protrudes radially inwardly from an end of the third lobe 116a and is configured to retain the races 90a in place relative to the housing 22. The races 90a are retained in the length direction L between the annular shoulder 119a and a rear side of the driven gear 70a. However, this is not a limiting example, and the disclosure also contemplates examples wherein the at least a portion of the bearing is formed as a single piece with the stiffening insert 110a, i.e., such that the stiffening insert 110a and for example the outer race 90a of the bearing are a monolithic part, as described herein above.

Advantageously, the embodiments described herein above facilitate a quieter gearcase compared to the prior art, wherein the housing of the gearcase is stiffened at least in locations proximate to the gearset, thereby making the housing a less effective converter of gearset vibrations into sound. In non-limiting examples, the housing 22 may be a cast part, and the stiffening insert 110, 110a may be cast-in-place during formation of the housing 22, thus advantageously providing an arrangement that is easy to manufacture. Optionally the outer surfaces of the stiffening insert 100, 110a may include grooves (as shown) or other recesses which facilitate engagement between the stiffening insert 100, 110a and the housing during the molding process. In some examples, the present inventors have also determined that it may be advantageous to preheat the stiffening insert prior to casting in the housing, to avoid a large temperature gradient between the different materials of the housing and stiffening insert. The present inventors have also determined that it may be advantageous to control the temperature of the respective components during the casting process to create a pre-tension between the components in the final part, thus providing tunability for controlling noise, vibration and harshness. For example, because the material of the stiffening insert 110, 110a and the housing 22 are different, so too are the coefficient of thermal expansion of the respective materials. So, during the forming (e.g. molding) process, the pre-heat temperature of the insert will affect the overall performance and durability of the gearcase 20, 20a. Temperature affects not just the formation of a chemical bond between the material of the stiffening insert and the material of the housing, but also formation of a mechanical bond with the noted grooves, since heating the stiffening insert 110, 110a will expand the grooves to allow more material (e.g. aluminum) into the grooves during casting, which will then become clamped in place as the materials cool and the grooves contract. Also, as the stiffening insert 110, 110a (for example made of steel) and housing 22 (for example made of aluminum) cool together, the stiffening insert 110, 110a will have less shrink than the housing 22. This will place the material of the housing 22 around the stiffening insert 110, 110a under a pre tensile stress because during cooling, it effectively will result in a "shink-fit" of the material (e.g., aluminum) of the housing 22 around the material (e.g. steel) of the stiffening insert. Therefore, controlling the temperature of the stiffening insert 110, 110a before formation (e.g., casting) helps control the state of stress of the material (e.g., aluminum) of the housing 22 in the final part. The state of stress will affect the tendencies of the housing 22 to vibrate at different frequencies—higher tension would be higher frequencies—advantageously giving the manufacturer of the part the ability to "tune" the area of the housing 22 between the various gears to effectively push natural frequencies out of the operating range. However, too much tension stress in the housing 22 will increase the tendencies of the housing 22 to develop fractures in operation-once the full application loads have been applied to the housing 22 from the gear separating forces and propeller thrust forces and moments. So, a balance should be found, and the temperature of the insert during casting will need to be chosen appropriately and validated with testing for the particular part configuration.

This written description uses examples to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A gearcase for a marine drive, the gearcase comprising:
a housing made of a first material;
a driveshaft extending into the housing;
a propulsor shaft extending from the housing;
a gearset rotationally coupling the driveshaft to the propulsor shaft such that rotation of the driveshaft causes rotation of the propulsor shaft; and
a stiffening insert made of a second material that is stiffer than the first material, the stiffening insert reinforcing the housing in a manner that limits gear misalignment caused by gear forces and applied loads on the gearset wherein the stiffening insert comprises a monolithic body having a first lobe that surrounds the driveshaft and a second lobe that surrounds the propulsor shaft.

2. The gearcase according to claim 1, further comprising a driveshaft bearing supporting rotation of the driveshaft relative to the gearcase, wherein the stiffening insert is positioned between the driveshaft bearing and the housing.

3. The gearcase according to claim 2, wherein the stiffening insert surrounds the driveshaft bearing.

4. The gearcase according to claim 2, wherein the driveshaft bearing comprises a roller bearing and further wherein the stiffening insert and the roller bearing are separate pieces.

5. The gearcase according to claim 1, further comprising a propulsor shaft bearing supporting rotation of the propulsor shaft relative to the housing, wherein the stiffening insert is positioned between the propulsor shaft bearing and the housing.

6. The gearcase according to claim 5, wherein the stiffening insert surrounds the propulsor shaft bearing.

7. The gearcase according to claim 5, wherein the propulsor shaft bearing comprises a roller bearing and further wherein the stiffening insert and the roller bearing are separate pieces.

8. The gearcase according to claim 5, wherein the gearset comprises a drive gear on the driveshaft and a driven gear on the propulsor shaft, and further comprising a driven gear bearing supporting rotation of the driven gear relative to the propulsor shaft, and wherein the stiffening insert is positioned between the driven gear bearing and the housing.

9. The gearcase according to claim 8, further comprising a clutch configured to operatively engage the driven gear with the propulsor shaft such that rotation of the driven gear causes rotation of the propulsor shaft, and wherein the propulsor shaft bearing supports rotation of the driven gear and the propulsor shaft relative to the housing when the driven gear is operatively engaged with the propulsor shaft.

10. The gearcase according to claim 5, wherein the propulsor shaft bearing is a first propulsor shaft bearing supporting rotation of the propulsor shaft relative to the housing, and further comprising a second propulsor shaft bearing supporting rotation of the propulsor shaft relative to the housing, and wherein the stiffening insert is positioned between the first propulsor shaft bearing and the housing, and between the second propulsor shaft bearing and the housing.

11. The gearcase according to claim 10, wherein the gearset comprises a drive gear on the driveshaft, a first driven gear on the propulsor shaft, and a second driven gear on the propulsor shaft, and further comprising a first driven gear bearing supporting rotation of the first driven gear relative to the propulsor shaft and a second driven gear bearing supporting rotation of the second driven gear relative to the propulsor shaft, and wherein the stiffening insert is positioned between the first driven gear bearing and the housing, and between the second driven gear bearing and the housing.

12. The gearcase according to claim 11, wherein the stiffening insert surrounds the first driven gear bearing and the second driven gear bearing.

13. The gearcase according to claim 12, further comprising a driveshaft bearing supporting rotation of the driveshaft relative to the gearcase, wherein the stiffening insert surrounds the driveshaft bearing.

14. The gearcase according to claim 1, further comprising a driveshaft bearing supporting rotation of the driveshaft relative to the gearcase and a propulsor shaft bearing supporting rotation of the propulsor shaft relative to the housing, wherein the stiffening insert is positioned between the driveshaft bearing and the housing, and between the propulsor shaft bearing and the housing.

15. The gearcase according to claim 14, wherein the stiffening insert surrounds the driveshaft bearing and the propulsor shaft bearing.

16. The gearcase according to claim 1, wherein the first lobe surrounds a driveshaft bearing supporting rotation of the driveshaft relative to the housing and wherein the second lobe surrounds a propulsor shaft bearing supporting rotation of the propulsor shaft relative to the housing.

17. The gearcase according to claim 16, further comprising at least one arm that couples the first lobe to the second lobe.

18. The gearcase according to claim 17, wherein the at least one arm is one of a pair of arms and further wherein a through-bore passage facilitating supply of lubrication to the housing is defined between the pair of arms.

19. A method of manufacturing the gearcase according to claim 1, comprising casting the housing with the stiffening insert in the housing.

20. The method according to claim 19, comprising heating the stiffening insert prior to casting.

21. The method according to claim 19, comprising controlling temperature of the housing and the stiffening insert such that once the gearcase is formed the stiffening insert applies a pre-stress on the gearcase.

22. The method according to claim 19, comprising selecting an ideal pre-stress on the gearcase for limiting noise of the gearcase, and then controlling temperature of the housing and the stiffening insert such that once the gearcase is formed stiffening insert applies the ideal pre-stress on the gearcase.

23. The method according to claim 19, comprising providing the stiffening insert with grooves that form a mechanical bond with the housing during said casting.

\* \* \* \* \*